United States Patent
Long (10) Patent No.: US 8,209,679 B2
(45) Date of Patent: Jun. 26, 2012

(54) COMPUTER IMPLEMENTED METHOD AND SYSTEM FOR PROCESSING A CLIENT REQUEST FOR AN APPLICATION PROGRAM

(75) Inventor: Jie Long, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1270 days.

(21) Appl. No.: 11/331,497

(22) Filed: Jan. 12, 2006

(65) Prior Publication Data

US 2007/0162460 A1 Jul. 12, 2007

(51) Int. Cl.
G06F 9/44 (2006.01)
(52) U.S. Cl. ...................................................... 717/173
(58) Field of Classification Search .......... 717/168–178; 707/10, 200, 174–176; 709/238, 219, 217; 710/36
See application file for complete search history.

(56) References Cited

U.S. PATENT DOCUMENTS

| | | | | |
|---|---|---|---|---|
| 7,062,765 B1 * | 6/2006 | Pitzel et al. | ................... | 717/177 |
| 7,140,013 B2 * | 11/2006 | Te'eni et al. | ................... | 717/173 |
| 7,415,707 B2 * | 8/2008 | Taguchi et al. | ............... | 717/174 |
| 7,451,440 B2 * | 11/2008 | Zweifel | ......................... | 717/168 |
| 2002/0099798 A1 * | 7/2002 | Fedorovsky et al. | ......... | 709/219 |
| 2005/0227683 A1 * | 10/2005 | Draluk et al. | ................. | 455/419 |
| 2006/0248161 A1 * | 11/2006 | O'Brien et al. | ............... | 709/217 |
| 2007/0038642 A1 * | 2/2007 | Durgin et al. | ................... | 707/10 |

* cited by examiner

*Primary Examiner* — Tuan Anh Vu
(74) *Attorney, Agent, or Firm* — Kilpatrick, Townsend & Stockton LLP (57) ABSTRACT

A computer implemented method and system for processing a client request for an application program. The application program may require one or more software applications as prerequisites. In response to a client request for the application program, the system automatically determines prerequisite application programs associated with the requested application program. The prerequisite applications include a first set of direct prerequisite application programs and a second set of indirect prerequisite application programs. The method includes checking whether the second set contains a duplicate prerequisite application program that corresponds to an original prerequisite application program existing in the first set, and removing the original prerequisite application program from the first set automatically if the second set contains the duplicate prerequisite application program. Further, the method includes saving non-duplicated prerequisite programs of the first set. The pruned set of prerequisite programs and the requested program may be downloaded to the client.

18 Claims, 5 Drawing Sheets

COMPUTER IMPLEMENTED METHOD AND SYSTEM FOR PROCESSING A CLIENT REQUEST FOR AN APPLICATION PROGRAM

FIELD OF THE INVENTION

Embodiments of the present invention generally relate to application program updating, and more particularly, to a computer implemented method and system for processing a client request for an application program update.

BACKGROUND

For a variety of reasons, software developers distribute application program updates, e.g., patches, to users. For example, a patch can be utilized to update a software program, allowing it greater functionality, usability, and performance. In another example, a patch can be applied to correct technical problems or programming bugs that exist in the underlying software version.

Generally, a patch is not a stand-alone program and may require a set of prerequisite application programs, e.g., prerequisite patches, to be pre-applied in the correct order prior to the application of the patch. If not all prerequisite application programs, e.g., prerequisite patches, are pre-applied properly in the correct order, the patch may fail to function correctly.

Usually, one or more of the prerequisite application programs, e.g., prerequisite patches, needed for the patch requires additional prerequisite application programs as well. Consequently, the total number of required prerequisite application programs, e.g., prerequisite patches, is often quite large. Traditionally, a user that desires to apply a patch has to manually traverse the possible prerequisites in order to ascertain which application programs are needed. Also, the user has to manually remove duplicate prerequisites at different levels of the prerequisite set. Further, the user has to manually sort the prerequisite application programs, e.g., prerequisite patches, into the correct application order and then download and apply them.

Frequently, manually traversing the prerequisites, manually removing duplicate prerequisite application programs, e.g., prerequisite patches, and manually sorting the prerequisite application programs, e.g., prerequisite patches, into the correct application order can lead to several difficulties. For example, manually traversing the tens of thousands of prerequisite application programs, e.g., prerequisite patches, in order to ascertain which files are needed can be extremely time consuming, tedious, and inefficient. Similarly, manually removing duplicate prerequisites at different levels of prerequisite set is both inefficient and susceptible to human error. Correspondingly, manually sorting the large number of prerequisite application programs, prerequisite patches, into the correct application order is uneconomical and prone to mistakes.

SUMMARY

Accordingly, embodiments of the present invention are directed to an automated method for responding to a client request for a software update, e.g., a patch. The system is computer implemented and in response to the request, it automatically determines the prerequisites required to install the requested software. The prerequisite are sorted in the proper installation order and duplicates are automatically identified and removed. The files are then downloaded, including the requested software update, e.g., a patch, and may be installed on the client computer system. Although the example of a software update is disclosed, embodiments of the present invention may apply to any software application.

More specifically, a computer implemented method and system for processing a client request for an application program are disclosed. The application program may be a software update patch, an updated application version, or any requested data or software. The method includes in response to receiving a client request for the application program, automatically determining the prerequisite application programs associated with the application program. The prerequisite application is found by SQL query and includes a first set of direct prerequisite application programs that may require a second set of direct and/or indirect prerequisite application programs and so on in a hierarchical fashion. Further, the method includes saving the first set of direct prerequisite application programs onto a memory. The method includes checking whether the second set contains a duplicate prerequisite direct and/or indirect application program that corresponds to an original prerequisite application program existing in the first level, and removing the original prerequisite application program from the first level automatically if the second set includes the duplicate prerequisite application program. This is performed to remove duplicate files, e.g., prerequisite application programs or patches. The levels are then ordered in reverse and downloaded to the client for installation. The requested software is then downloaded for installation.

In one embodiment, the method includes receiving a client request for the application program wherein the application program is associated with a database system and requires a plurality of prerequisite application programs to be installed for proper operation of the application program. Further, the method includes automatically scanning an application database to determine the plurality of prerequisite application programs and an ordering of installation thereof. A hierarchical tree structure is scanned to determine prerequisites related to a root node where the root corresponds to the requested software. Moreover, the method includes downloading the plurality of prerequisite application programs according to the ordering to the client and downloading the application program to the client for installation thereon.

In another embodiment, a computer system for processing a client request for the application program is disclosed. The computer system includes a processor. Also, the computer system includes a bus coupled to the processor. Further, the computer system includes a memory coupled to the bus for storing instructions that when executed by the processor implements a method of processing a client request for an application program. The method includes receiving a client request for the application program wherein the application program is associated with a database system and requires a plurality of prerequisite application programs to be installed for proper operation of the application program. In addition, the method includes automatically scanning an application database to determine the plurality of prerequisite application programs and an ordering of installation thereof. A hierarchical tree structure is scanned to determine prerequisites related to a root node that represents the registered software. Furthermore, the method includes downloading the plurality of prerequisite application programs according to the ordering and workload configuration to the client and downloading the application program to the client for installation thereof.

In addition, embodiments are also directed to a computer readable media implemented in accordance with the methods as disclosed above.

Also, it is appreciated that in accordance with the embodiment described above, the client advantageously need not manually determine and/or order the plurality of prerequisite programs.

DETAILED DESCRIPTION OF THE DRAWINGS

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Figure 1:
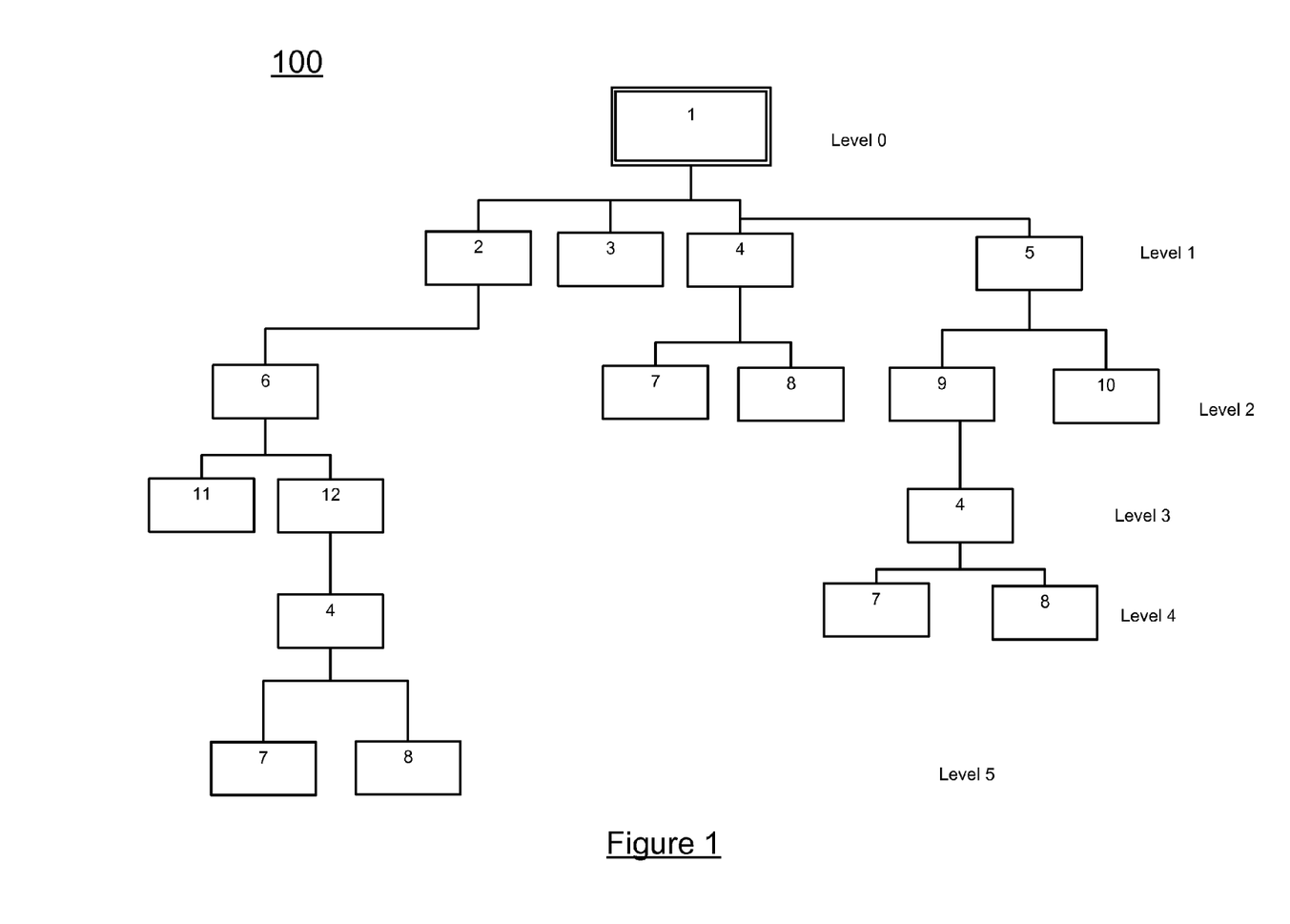
FIG. 1 illustrates a block diagram of a prerequisite tree structure, used in accordance with an embodiment of the present invention.

FIG. 1 illustrates an exemplary patch's prerequisite application programs, e.g., prerequisite patches, in a tree like data structure. Although prerequisite tree 100 is shown and described as having certain numbers and types of elements, the present invention is not so limited; that is, prerequisite tree 100 may include elements other than those shown, and may include more than one of the elements that are shown.

The prerequisite tree 100 is stored in a computer memory, e.g., database table, and has a root node 1 on level 0 that corresponds to the requested patch and requires the installation of prerequisite application programs shown on prerequisite tree 100 in order to function properly. Also, the prerequisite tree 100 may contain additional prerequisite application programs, e.g., prerequisite patches that are not shown. Further, the prerequisite tree 100 has multiple levels, e.g., level 1 through level 5. The first level of the prerequisites tree 100 includes the direct prerequisite application program set required by the patch itself, e.g. 2, 3, 4, and 5, the second level contains one or more indirect prerequisite application program sets required by each of the prerequisite application programs on the first layer, and the third level contains one or more indirect prerequisite application program sets required by each of the prerequisite application program on the second level and so on. Sometimes, a "branch" of the prerequisites tree 100 ends and does not require additional prerequisite application programs, e.g., 3 on level 1. Also, a file may require multiple prerequisite application programs, e.g. 6 on level 2. A connection in the tree means that the parent node requires the child node as a prerequisite. Commonly, because different files, e.g., patches, may require the same prerequisite application program, a prerequisite application program on a higher level may have a duplicate prerequisite application program that exists on a lower level, e.g., 4 exists on levels 1, 3, and 4. Since the patch does not require redundant application of a prerequisite application program, it is not necessary to store and send multiple copies of the prerequisite application program to a client. Consequently, in accordance with embodiments of the present invention, duplicate prerequisite application programs, e.g., prerequisite patches, associated with its sub tree are automatically identified and removed to improve overall efficiency.

As discussed further below, in response to a client request, an embodiment may scan this tree structure or database of prerequisites to obtain a listing of prerequisites. Also, duplicates are removed. It is appreciated that any node in the tree 100 may be a requested application by the client. In this case, that node becomes the "root" node and the process of the present invention then starts there and scans down the tree. It is appreciated that any of a number of well-known tree traversal techniques can be used in accordance with the present invention. One such traversal technique that may be used is post-order tree traversal. In one embodiment, the tree 100 is traversed from the root downward through the levels and the temporary table is populated with the results of the traversal.

In one exemplary traversal, in accordance with embodiments of the present invention, at time T1, the direct prerequisite application programs of application program 1, e.g., application programs 2, 3, 4, and 5 on level 1 are scanned and saved onto a temporary table.

At time T2, the prerequisite application programs of application program 2 on level 1, e.g., application programs 6, 11, 12, 4, 7, and 8, are found via SQL query. Because a duplicate application program 4 exists in application program 2's sub-tree, application program 4 is automatically removed from the temporary table. Removal can be implemented in a variety of ways. In one example, removal means that a duplicate file is marked or flagged as deleted but not physically erased from memory, e.g., temporary table. In another example, removal means a duplicate file is marked as deleted and physically erased from memory.

At time T3, the direct prerequisite application program of application program, 2, e.g., application program 6 on level 2, is scanned and stored into temporary table.

At time T4, the direct prerequisite application programs of application program 6, e.g., application programs 11 and 12 on level 3, are scanned and stored into temporary table. Also, in the present embodiment, consistent with post-order traversal, application program 11 is stored into the result set, which is subsequently downloaded to the client.

At time T5, the direct prerequisite application program of application program 12, e.g., application program 4 on level 4, is scanned and stored into temporary table.

At time T6, the direct prerequisite application programs of application program 4, e.g., application programs 7 and 8 on level 5, are scanned and stored into temporary table. Also, application programs 7 and 8 are stored into the result set. Further, from time T7, T8, T9, through T10, application programs 4, 12, 6, and 2 are serially stored onto the result set.

At time T11, the direct prerequisite application programs of application program 5, e.g., application programs 9 and 10 on level 2, are scanned and stored into the temporary table. Also, the prerequisite application program of application program 9, e.g., application program 4 on level 3 is not stored into the temporary table because a duplicate application program 4 already exists.

Furthermore, from time T12, T13, T14, T15, and T16, application programs 3, 9, 10, 5, and 1 are serially stored onto the result set. After a traversal of the prerequisite is completed, all duplicate application programs are removed and only non-repeated application programs remain in result set. Thus, the present invention allows a more efficient use of storage space. Also, the application programs existing in the result set is downloaded to the client.

The details of the exemplary traversal of prerequisite tree 100 are summarized in Table 1 below.

TABLE 1

Exemplary post-order tree traversal of prerequisite tree 100 of FIG. 1.

| Temporary table | Result set | Time |
|---|---|---|
| 2, 3, 4, 5 | | T1 |
| 2, 3, 5 | | T2 |
| 2, 3, 5, 6 | | T3 |
| 2, 3, 5, 6, 11, 12 | 11 | T4 |
| 2, 3, 5, 6, 11, 12, 4 | | T5 |
| 2, 3, 5, 6, 11, 12, 4, 7, 8 | 11, 7, 8 | T6 |
| | 11, 7, 8, 4 | T7 |
| | 11, 7, 8, 4, 12 | T8 |
| | 11, 7, 8, 4, 12, 6 | T9 |
| | 11, 7, 8, 4, 12, 6, 2 | T10 |
| 2, 3, 5, 6, 11, 12, 4, 7, 8, 9, 10 | | T11 |
| | 11, 7, 8, 4, 12, 6, 2, 3 | T12 |
| | 11, 7, 8, 4, 12, 6, 2, 3, 9 | T13 |
| | 11, 7, 8, 4, 12, 6, 2, 3, 9, 10 | T14 |
| | 11, 7, 8, 4, 12, 6, 2, 3, 9, 10, 5 | T15 |
| | 11, 7, 8, 4, 12, 6, 2, 3, 9, 10, 5, 1 | T16 |

The prerequisite type of the application programs are illustrated in Table 2 below.

TABLE 2

A table showing the prerequisite type of the application programs in prerequisite tree 100 of FIG. 1.

| Application program | Prerequisites | Prerequisites Type (Direct/Indirect) |
|---|---|---|
| 1 | 2 | Direct |
| 1 | 3 | Direct |
| 1 | 4 | Direct |
| 1 | 5 | Direct |
| 1 | 6 | Indirect |
| 1 | 7 | Indirect |
| 1 | 8 | Indirect |
| 1 | 9 | Indirect |
| 1 | 10 | Indirect |
| 1 | 11 | Indirect |
| 1 | 12 | Indirect |
| 2 | 6 | Direct |
| 2 | 4 | Indirect |
| 2 | 7 | Indirect |
| 2 | 8 | Indirect |
| 2 | 11 | Indirect |
| 2 | 12 | Indirect |
| 4 | 7 | Direct |
| 4 | 8 | Direct |
| 5 | 9 | Direct |
| 5 | 10 | Direct |
| 5 | 4 | Indirect |
| 5 | 7 | Indirect |
| 5 | 8 | Indirect |

The structure of a temporary table corresponding to T1 of Table 1 (before removal of duplicate application program 4) is illustrated in Table 3 below.

TABLE 3

A table showing temporary table structure of time T1 corresponding to Table 1.

| Main application program | Prerequisites |
|---|---|
| 1 | 2 |
| 1 | 3 |
| 1 | 4 |
| 1 | 5 |

The structure of a temporary table corresponding to T2 of Table 1 (after removal of duplicate application program 4) is illustrated in Table 4 below.

TABLE 4

A table showing temporary table structure of time T2 corresponding to Table 1.

| Main application program | Prerequisites |
|---|---|
| 1 | 2 |
| 1 | 3 |
| 1 | 5 |

Figure 2:
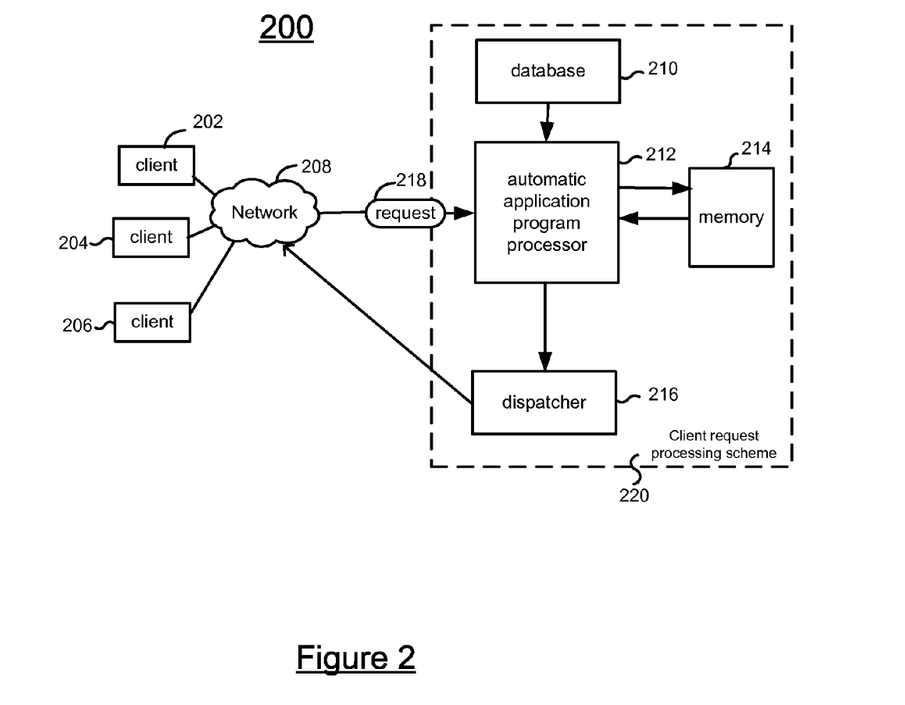
FIG. 2 illustrates a block diagram of an exemplary computer network environment upon which embodiments of the present invention can be implemented.

FIG. 2 illustrates a block diagram of an exemplary computer network environment 200 upon which embodiments of the present invention can be implemented. Components of the system for processing a client request for an application program include memory 214, database 210, automatic application program processor 212, dispatcher 216, network 208, client 202, client 204, client 206, request 218, and client request processing scheme 220. The database 210 may include an organized body of related information that may contain a plurality of application programs. In one embodiment, database 210 includes a hierarchical organization of data that indicates prerequisite application programs, e.g., as shown in FIG. 1. Request 218 may be a request for an application program. In one example, clients 202, 204, and 206 can be external users that are coupled to the automatic application program processor 212 through a wide area network, e.g., internet. In another example, exemplary clients 202, 204, and 206 can be internal users that are coupled to the automatic application program processor 212 through a local area network.

The network 208 may be a data communications system that interconnects computer systems at various different sites. The network 208 can be implemented in a wide variety of ways. For example, network 208 can be implemented as, but is not limited to, a local area network (LAN), a metropolitan area network (MAN), a wide area network (WAN), and/or the internet. It is noted that the network environment 200 can also be implemented without network 208. As such, database 210, dispatcher 216, and clients 202, 204, and 206 can be communicatively coupled via wired and/or wireless communication technologies.

Each of the clients 202, 204, and 206 may be communicating with the database 210 thorough the network 208 that may include, for example, the internet, a leased line and/or some other public, private, and/or hybrid network. Any of a number of well known communication links may be used.

The automatic application program processor 212 is coupled to the database 210, memory 214, and dispatcher 216. The dispatcher 216 may send, e.g., download, application programs to clients 202, 204, and 206 through network 208. Clients 202, 204, and 206 may each send a request 218 to the automatic application program processor 212 through network 208.

The components of the client request processing scheme 220 cooperatively operate to efficiently process client requests. The automatic application program processor 212 receives request 218 for an application program associated with database 210 requiring a plurality of prerequisite application programs to be installed for proper operation.

In accordance with embodiments of the present invention, the automatic application program processor 212 automatically scans the database 210 to determine the plurality of prerequisite application programs that are associated with the requested application and an ordering of installation thereof. Memory 214 is used cooperatively to determine this listing and the installation order. According to the hierarchical organization of the database 210, the plurality of prerequisite application programs include a first set of prerequisite application programs that requires a second set of prerequisite application programs. In addition, other sets of prerequisite application programs may also be required.

Dispatcher 216 downloads the plurality of prerequisite application programs to the clients 202, 204, and 206. The requested software application is also downloaded. Clients 202, 204, and 206 may install the plurality of prerequisite application programs according a proper installation order.

In addition, within FIG. 2, it is understood that network environment can be implemented to include greater or fewer number of clients than the three clients (e.g. 202, 204, and 206) shown.

Figure 3:
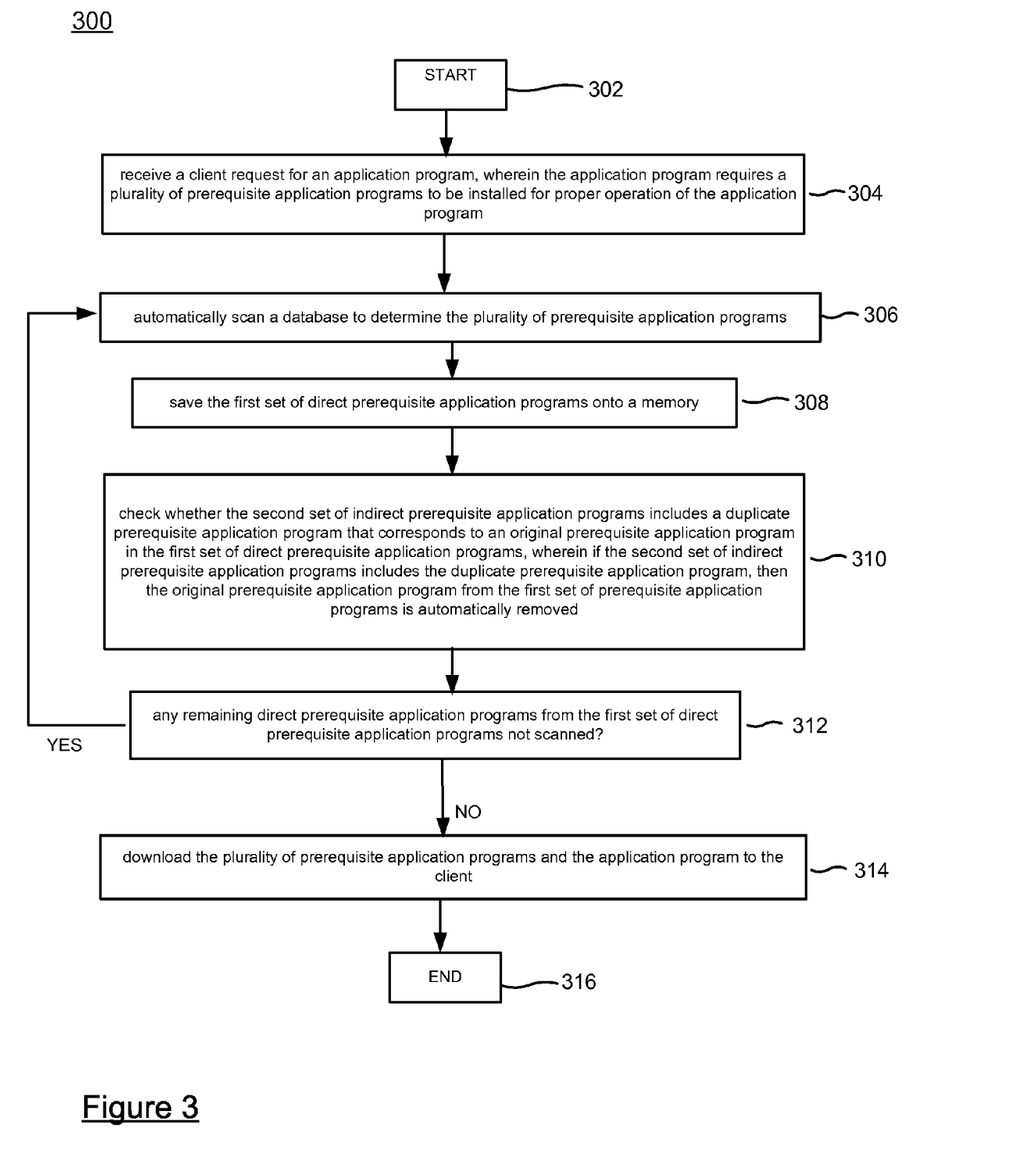
FIG. 3 illustrates a flowchart showing a computer implemented method for processing a client request for an application program, according to an embodiment of the present invention.

FIG. 3 illustrates a flowchart showing a computer implemented method 300 for processing a client request for an application program, according to an embodiment of the present invention. Method 300 is effective and efficient for processing a client request for an application program. Although specific steps are disclosed in flowchart 300, such steps are exemplary. That is, embodiments of the present invention are well suited to performing various other or additional steps or variations of the steps recited in flowchart 300. It is appreciated that the steps in flowchart 300 may be performed in an order different than presented.

At block 302, the process starts.

At block 304, a client request for the application program is received at processor 212, wherein the application program is associated with an application database system and requires a plurality of prerequisite application programs to be installed for proper operation of the application program, wherein the plurality of prerequisite application programs further includes a first set of direct prerequisite application programs, wherein a prerequisite application program of the first set of prerequisite application programs requires a indirect second set of prerequisite application programs. It is appreciated that the present invention is readily adaptable for implementation with a variety of application programs. For example, embodiments of the present invention can be implemented using a software patch application program. In another example, the present invention can be implemented using an application update program.

At block 306, an application database 210 is automatically scanned to determine the plurality of prerequisite application programs and an ordering of installation thereof. It is appreciated that automatically scanning can be implemented in a variety of ways. In one example, a single application database is automatically scanned to determine the plurality of prerequisite application programs. In another example, more than one application database is automatically scanned to determine the plurality of prerequisite application programs. In yet another example, the entirety of one or more application database is automatically scanned to determine the plurality of prerequisite application programs. In still another example, one or more application database is partially automatically scanned to determine the plurality of prerequisite application programs.

At block 308, the first set of prerequisite application programs are saved onto a memory. In one example, memory can be a non-volatile memory, e.g., hard drive storage. In another example, memory can be a volatile memory, e.g., Static Random Access Memory (SRAM), Dynamic Random Access Memory (DRAM), and other types of Random Access Memory (RAM). In addition, it is appreciated that structure of memory can be implemented in a variety of ways. In one example, memory can be a temporary table. In another example, memory can be a linear list. In yet another example, memory can have other types of hierarchical structure.

At block 310, the second set of indirect prerequisite application programs is checked to determine whether it includes a duplicate prerequisite application program that corresponds to an original prerequisite application program in the first set of direct prerequisite application programs, wherein if the second set of indirect prerequisite application programs includes the duplicate prerequisite application program, then the original prerequisite application program from the first set of prerequisite application programs is automatically removed. Removal can be implemented in a variety of ways. In one example, removal can mean the original prerequisite application program is physically erased from memory. In another example, removal can mean that the original prerequisite application program is marked as deleted but not physically erased from memory.

At block 312, if any direct prerequisite application programs from the first set of direct prerequisite applications program remains, then the database is re-scanned.

At block 314, the plurality of prerequisite application programs is downloaded to the client. In one embodiment, the set of prerequisite application programs are downloaded serially. In another embodiment, the set of prerequisite application programs are downloaded simultaneously. Also, the application program is downloaded to the client. In one embodiment, the plurality of prerequisite application programs and the application program are downloaded to the client using a dispatcher. In another embodiment, the plurality of prerequisite application programs and the application program are downloaded to the client from the automatic application program processor.

At block 316, the process ends.

Figure 4:
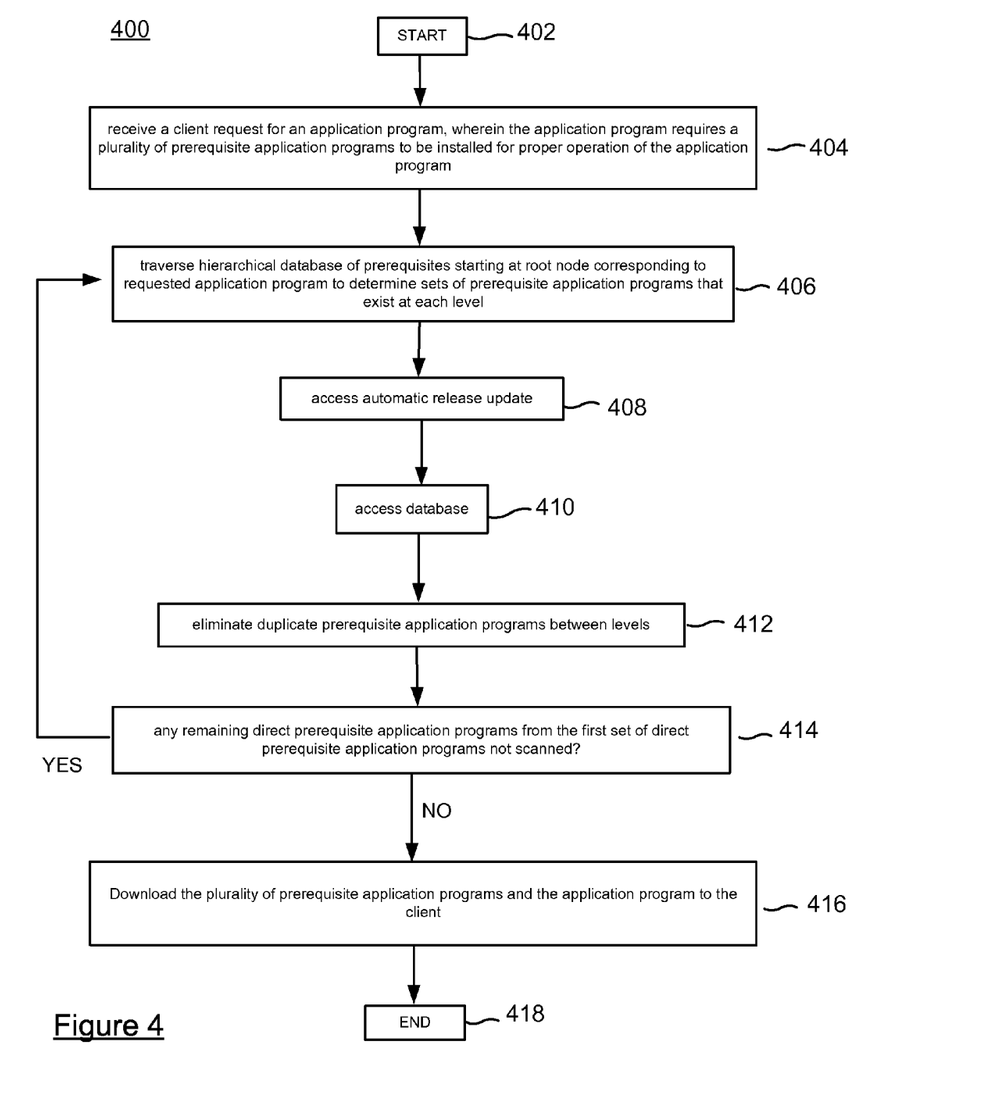
FIG. 4 illustrates a flowchart showing a computer implemented method for processing a client request for an application program that utilizes a memory stored hierarchical organization of prerequisite application programs, according to an embodiment of the present invention.

FIG. 4 illustrates a flowchart showing a computer implemented method 400 for processing a client request for an application program, according to another embodiment of the present invention that utilizes a hierarchical tree organized database. Although specific steps are disclosed in flowchart 400, such steps are exemplary. That is, embodiments of the present invention are well suited to performing various other or additional steps or variations of the steps recited in flowchart 400. It is appreciated that the steps in flowchart 400 may be performed in an order different than presented.

At block 402, the process starts.

At block 404, a client request for the application program is received at automatic application program processor 212, wherein the application program is associated with a database system and requires a plurality of prerequisite application programs to be installed for proper operation of the application program, wherein the database system comprises a hierarchical organization of prerequisite application programs based on dependency. In one embodiment, the hierarchical organization of prerequisite application programs has a tree like structure, shown in FIG. 1 for instance. The application program is located at the "root" of the tree like structure and the prerequisite application programs are located at descending levels of the tree like structure, according to the branch connections. The direct prerequisite application programs of the application program are located at a level immediately below the "root" of the tree. A number of additional prerequisite application programs required by the direct prerequisite application programs are located on the level immediately below the direct prerequisite application programs. In turn, these prerequisites may have others as shown by the parent-child branch connections.

At block 406, the hierarchical organization of prerequisite application programs is scanned to determine the sets of prerequisite application programs that exist at each level.

It is appreciated that automatically scanning can be implemented in a variety of ways. In one example, a single independent application database is automatically scanned to determine the plurality of prerequisite application programs. In another example, more than one inter-dependent application databases are automatically scanned to determine the plurality of prerequisite application programs. In yet another example, the entireties of one or more inter-dependent application databases are automatically scanned to determine the plurality of prerequisite application programs. In still another example, one or more inter-dependent application databases are only partially automatically scanned to determine the plurality of prerequisite application programs.

At block 408, the automatic release update is accessed. In one embodiment, the automatic release updated is accessible to an internal client having access to the application database, e.g., a client located in the local network.

At block 410, the database is accessed. In one embodiment, the database is accessible to an external client having access to the application database, e.g., a client accessing the application database through a Wide Area Network (WAN). A database access may require the client to have a prior registration and access credentials with the database.

At block 412, duplicate prerequisite application programs are eliminated between the levels. It is appreciated that eliminating duplicate prerequisite application programs can be implemented in a variety of ways. In one example, eliminating can mean labeling the duplicate prerequisite application programs for deletion. In another example, eliminating can mean erasing the duplicate prerequisite application programs from physical memory.

At block 414, if any direct prerequisite application programs from the first set of direct prerequisite applications program remains, then the database is re-scanned.

At block 416, the plurality of prerequisite application programs is downloaded to the client. Also, the requested application program is downloaded to the client. In one embodiment, the plurality of prerequisite application programs is sent to the dispatcher, and the dispatcher sends the plurality of prerequisite application programs to the client.

At block 418, the process ends.

Figure 5:
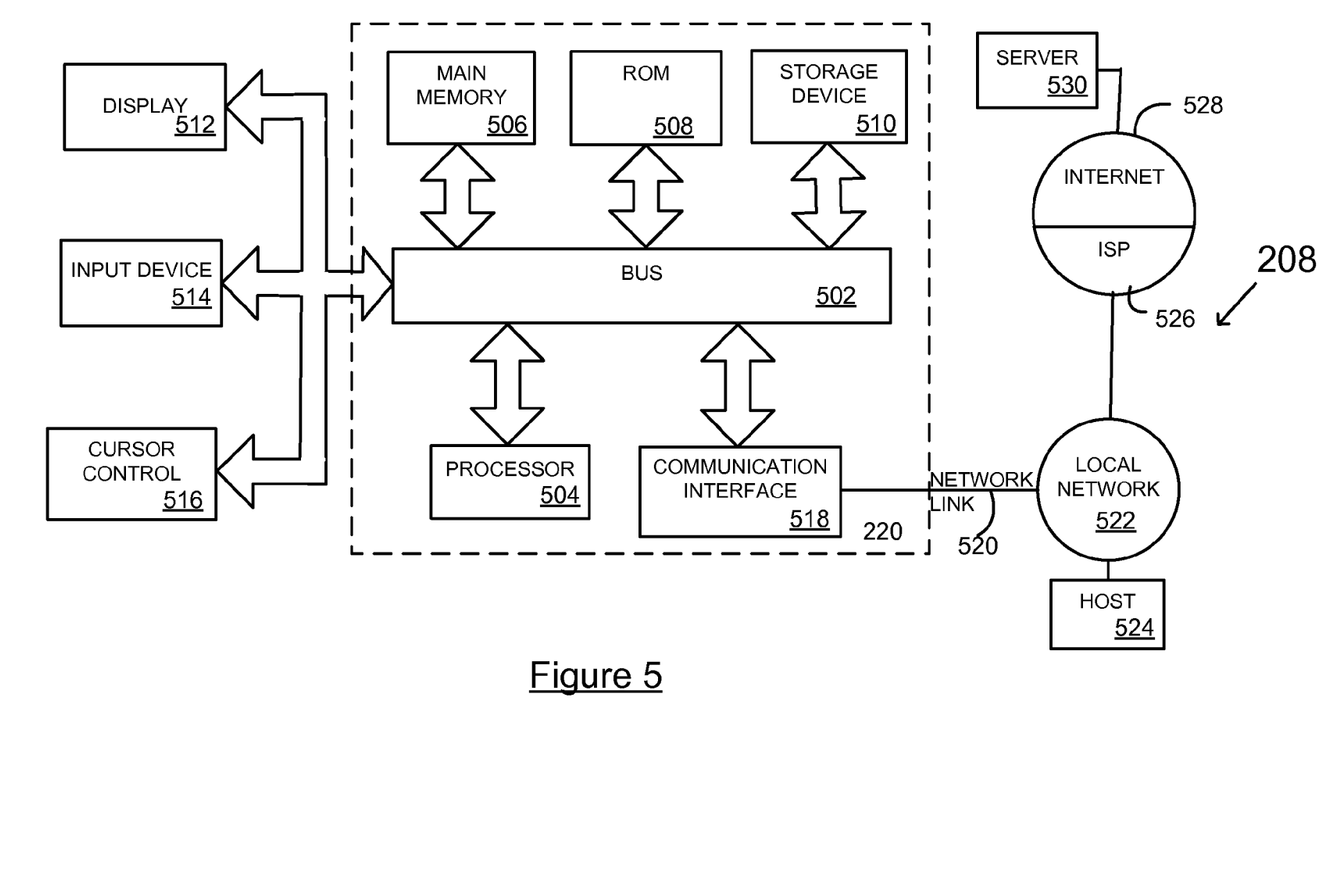
FIG. 5 is a block diagram that illustrates a computer system upon which an embodiment of the invention may be implemented.

FIG. 5 is a block diagram that illustrates a computer system 220 upon which an embodiment of the invention may be implemented, e.g., the system of FIG. 2. Computer system 220 includes a bus 502 or other communication mechanism for communicating information, and a processor 504 coupled with bus 502 for processing information. Computer system 220 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 220 further includes a read only memory (ROM) 508 or other static storage device coupled to bus 502 for storing static information and instructions for processor 504. A non-volatile storage device 510, such as a magnetic disk or optical disk, is provided and coupled to bus 502 for storing information and instructions and may store the persistent internal queue.

Computer system 220 may be coupled via bus 502 to an optional display 512, such as a cathode ray tube (CRT), for displaying information to a computer user. An optional input device 514, including alphanumeric and other keys, may be coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512.

The invention is related to the use of computer system 220 for processing a client request for an application program. According to one embodiment of the invention, the processing of a client request for an application program is provided by computer system 220 in response to processor 504 executing one or more sequences of one or more instructions contained in main memory 506. Such instructions may be read into main memory 506 from another computer readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 220 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 220 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information. Network 208 of FIG. 2 may include link 520, local network 522 and Internet 528, for instance.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 220, are example forms of carrier waves transporting the information.

Computer system 220 can send application programs, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. In this manner, computer system 220 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer implemented method for processing a client request for a plurality of patch files for an application program, said method comprising:
    receiving at an automatic application program processor system a client request for a first patch file of the plurality of patch files, wherein said request identifies only the first patch file and said first patch file requires a set of direct prerequisite application programs to be installed for proper operation of said application program;
    automatically scanning by the automatic program processor system in response to the client request a database to determine said set of direct prerequisite application programs required by the first patch file;
    automatically generating by the automatic program processor system a pre-requisite tree data structure representing the application program and the set of direct prerequisite application programs required by the first patch file, wherein a first hierarchical level of the prerequisite tree represents the application program and a second hierarchical level of the prerequisite tree lower than the first hierarchical level represents the set of direct prerequisite application programs required by the first patch file;
    automatically storing by the automatic program processor system the prerequisite tree in a temporary table;
    receiving at the automatic application program processor system a client request for a second patch file of the plurality of patch files, wherein said request identifies only the second patch file and said second patch file requires a set of direct and indirect prerequisite application programs to be installed for proper operation of said application program;
    automatically scanning by the automatic program processor system in response to the client request the database to determine said set of direct and indirect prerequisite application programs required by the second patch file;
    automatically updating by the automatic program processor system the prerequisite tree data structure to include the second patch file and the set of direct and indirect prerequisite application programs required by the second patch file, wherein the second hierarchical level of the updated prerequisite tree further represents the set of direct prerequisite application programs required by the second patch file and a third hierarchical level of the updated prerequisite tree lower than the second hierarchical level of the updated prerequisite tree represents the indirect prerequisite application programs required by the second patch file;
    automatically storing by the automatic program processor system the updated prerequisite tree in the temporary table; and
    automatically downloading from a dispatcher system each of said set of direct prerequisite application programs required by the first patch file, and the set of direct and indirect prerequisite application programs required by the second patch file in reverse order of the hierarchical levels of the updated prerequisite tree.

2. The computer implemented method of claim 1, wherein said automatically scanning comprises:
    saving said set of direct prerequisite application programs required by the second patch file onto a memory; and
    checking whether said set of direct and indirect prerequisite application programs required by the second patch file includes a duplicate prerequisite application program that corresponds to a direct prerequisite application program required by the first patch file, wherein if said set of direct and indirect prerequisite application programs includes said duplicate prerequisite application program, then said direct prerequisite application program required by the first patch file is automatically removed from the updated prerequisite tree.

3. The computer implemented method of claim 2, wherein said memory is a temporary table.

4. The computer implemented method of claim 1, wherein said database comprises a hierarchical organization of prerequisite application programs based on dependency.

5. The computer implemented method of claim 4, wherein said automatically scanning and updating comprise:
scanning said hierarchical organization of direct and indirect prerequisite application programs to determine sets of direct and indirect prerequisite application programs that exist at each level of the updated prerequisite tree;
eliminating duplicate direct and indirect prerequisite application programs between different levels of the updated prerequisite tree; and
ordering the remainder direct and indirect prerequisite application programs for downloading.

6. The computer implemented method of claim 5, further comprising the client installing said plurality of prerequisite application programs according to said ordering.

7. The computer implemented method of claim 1, wherein said scanning comprises accessing automatic release update.

8. The computer implemented method of claim 1, wherein said scanning comprises accessing database.

9. A computer system comprising:
a processor;
a bus coupled to said processor;
a memory coupled to said bus for storing instructions that when executed by the processor implement a method of processing a client request for a plurality of application programs at a first hierarchical level, said method comprising:
receiving at an automatic application program processor module a client request for a first patch file of the plurality of patch files, wherein said request identifies only the first patch file and said first patch file requires a set of direct prerequisite application programs to be installed for proper operation of said application program;
automatically scanning by the automatic program processor module in response to the client request a database to determine said set of direct prerequisite application programs required by the first patch file;
automatically generating by the automatic program processor module a pre-requisite tree data structure representing the application program and the set of direct prerequisite application programs required by the first patch file, wherein a first hierarchical level of the prerequisite tree represents the application program and a second hierarchical level of the prerequisite tree lower than the first hierarchical level represents the set of direct prerequisite application programs required by the first patch file;
automatically storing by the automatic program processor module the prerequisite tree in a temporary table;
receiving at the automatic application program processor module a client request for a second patch file of the plurality of patch files, wherein said request identifies only the second patch file and said second patch file requires a set of direct and indirect prerequisite application programs to be installed for proper operation of said application program;
automatically scanning by the automatic program processor module in response to the client request the database to determine said set of direct and indirect prerequisite application programs required by the second patch file;
automatically updating by the automatic program processor module the prerequisite tree data structure to include the second patch file and the set of direct and indirect prerequisite application programs required by the second patch file, wherein the second hierarchical level of the updated prerequisite tree further represents the set of direct prerequisite application programs required by the second patch file and a third hierarchical level of the updated prerequisite tree lower than the second hierarchical level of the updated prerequisite tree represents the indirect prerequisite application programs required by the second patch file;
automatically storing by the automatic program processor module the updated prerequisite tree in the temporary table; and
automatically downloading from a dispatcher module each of said set of direct prerequisite application programs required by the first patch file, and the set of direct and indirect prerequisite application programs required by the second patch file in reverse order of the hierarchical levels of the updated prerequisite tree.

10. The computer system as recited in claim 9, wherein said automatically scanning comprises:
saving said set of direct prerequisite application programs required by the second patch file onto a memory; and
checking whether said set of direct and direct prerequisite application programs required by the second patch file includes a duplicate prerequisite application program that corresponds to a direct prerequisite application program required by the first patch file, wherein if said set of direct and indirect prerequisite application programs includes said duplicate prerequisite application program, then said direct prerequisite application program required by the first patch file is automatically removed from the updated prerequisite tree.

11. The computer system as recited in claim 9, wherein said database comprises a hierarchical organization of prerequisite application programs based on dependency.

12. The computer system as recited in claim 11, wherein said automatically scanning and said updating comprise:
scanning said hierarchical organization of direct and indirect prerequisite application programs to determine sets of direct and indirect prerequisite application programs that exist at each level of the updated prerequisite tree;
eliminating duplicate direct and indirect prerequisite application programs between different levels of the updated prerequisite tree; and
ordering the remainder direct and indirect prerequisite application programs for downloading.

13. The computer system as recited in claim 12, wherein said method further comprises the client installing said plurality of prerequisite application programs according to said ordering.

14. A computer readable medium having stored therein instructions that when executed by a processor implement a method of processing a client request for a plurality of application programs, said method comprising:
receiving at an automatic application program processor system a client request for a first patch file of the plurality of patch files, wherein said request identifies only the first patch file and said first patch file requires a set of direct prerequisite application programs to be installed for proper operation of said application program;

automatically scanning by the automatic program processor system in response to the client request a database to determine said set of direct prerequisite application programs required by the first patch file;

automatically generating by the automatic program processor system a pre-requisite tree data structure representing the application program and the set of direct prerequisite application programs required by the first patch file, wherein a first hierarchical level of the prerequisite tree represents the application program and a second hierarchical level of the prerequisite tree lower than the first hierarchical level represents the set of direct prerequisite application programs required by the first patch file;

automatically storing by the automatic program processor system the prerequisite tree in a temporary table;

receiving at the automatic application program processor system a client request for a second patch file of the plurality of patch files, wherein said request identifies only the second patch file and said second patch file requires a set of direct and indirect prerequisite application programs to be installed for proper operation of said application program;

automatically scanning by the automatic program processor system in response to the client request the database to determine said set of direct and indirect prerequisite application programs required by the second patch file;

automatically updating by the automatic program processor system the prerequisite tree data structure to include the second patch file and the set of direct and indirect prerequisite application programs required by the second patch file, wherein the second hierarchical level of the updated prerequisite tree further represents the set of direct prerequisite application programs required by the second patch file and a third hierarchical level of the updated prerequisite tree lower than the second hierarchical level of the updated prerequisite tree represents the indirect prerequisite application programs required by the second patch file;

automatically storing by the automatic program processor system the updated prerequisite tree in the temporary table; and automatically downloading from a dispatcher system each of said set of direct prerequisite application programs required by the first patch file, and the set of direct and indirect prerequisite application programs required by the second patch file in reverse order of the hierarchical levels of the updated prerequisite tree.

15. The computer readable medium as recited in claim 14, wherein said automatically scanning comprises:

saving said set of direct prerequisite application programs required by the second patch file onto a memory; and checking whether said set of direct and indirect prerequisite application programs required by the second patch file includes a duplicate prerequisite application program that corresponds to a direct prerequisite application program required by the first patch file, wherein if said set of direct and indirect prerequisite application programs includes said duplicate prerequisite application program, then said direct prerequisite application program required by the first patch file is automatically removed from the updated prerequisite tree.

16. The computer readable medium as recited in claim 14, wherein said application database comprises a hierarchical organization of prerequisite application programs based on dependency.

17. The computer readable medium as recited in claim 14, wherein said automatically updating comprises:

scanning said hierarchical organization of direct and indirect prerequisite application programs to determine sets of direct and indirect prerequisite application programs that exist at each level of the updated prerequisite tree;

eliminating duplicate direct and indirect prerequisite application programs between different levels of the updated prerequisite tree; and ordering the remainder direct and indirect prerequisite application programs for downloading.

18. The computer readable medium as recited in claim 17, further comprising the client installing said plurality of prerequisite application programs according to said ordering.

* * * * *

UNITED STATES PATENT AND TRADEMARK OFFICE
CERTIFICATE OF CORRECTION

| | | |
|---|---|---|
| PATENT NO. | : 8,209,679 B2 | Page 1 of 1 |
| APPLICATION NO. | : 11/331497 | |
| DATED | : June 26, 2012 | |
| INVENTOR(S) | : Long | |

It is certified that error appears in the above-identified patent and that said Letters Patent is hereby corrected as shown below:

In column 4, line 50, delete "T3,the" and insert -- T3, the --, therefor.

In column 4, line 53, delete "T4,the" and insert -- T4, the --, therefor.

In column 14, line 32, in Claim 10, delete "direct prerequisite" and insert -- indirect prerequisite --, therefor.

Signed and Sealed this
Twenty-fifth Day of September, 2012

David J. Kappos
*Director of the United States Patent and Trademark Office*